United States Patent [19]

Tsuchida et al.

[11] Patent Number: 5,098,009
[45] Date of Patent: Mar. 24, 1992

[54] METHOD FOR JOINING JOINT PORTIONS OF ELECTROMAGNETIC WAVE SHIELDING MATERIALS

[75] Inventors: Yasuyoshi Tsuchida; Ryoichi Isoyama, both of Tokyo; Kazumasa Onishi; Kei Ito, both of Toda; Teruo Matsui; Hiroo Ueno, both of Yokohama, all of Japan

[73] Assignees: Fujita Corporation; ABC Trading Co., Ltd., both of Tokyo, Japan

[21] Appl. No.: 677,132

[22] Filed: Mar. 29, 1991

[30] Foreign Application Priority Data

Nov. 13, 1990 [JP] Japan .................. 2-304004

[51] Int. Cl.⁵ .............................. B23K 31/02
[52] U.S. Cl. .................... 228/189; 228/5.7
[58] Field of Search ............ 228/138, 189, 254, 5.7, 228/56.3

[56] References Cited

U.S. PATENT DOCUMENTS

| | | | |
|---|---|---|---|
| 1,290,091 | 1/1919 | Cole | 228/189 |
| 2,024,686 | 12/1935 | Farmer | 228/189 |
| 2,151,334 | 3/1939 | Rockefeller | 228/138 |
| 2,641,674 | 6/1953 | Orr et al. | 228/189 |

FOREIGN PATENT DOCUMENTS 58-100988 6/1983 Japan .................. 228/138

OTHER PUBLICATIONS

Research Disclosure, "Thin Film Splicing", No. 300, Apr. '89, Kenneth Mason Publications Ltd, England.

Primary Examiner—Samuel M. Heinrich
Attorney, Agent, or Firm—Wenderoth, Lind & Ponack

[57] ABSTRACT

A novel method for joining edge portions of electromagnetic wave shielding members is proposed. A joiner is prepared by solder-plating a surface of a narrow strip of electromagnetic wave shielding material of a metal foil or a metal sheet. The respective edge portions of adjacent electromagnetic wave shielding members made of metal sheets or metal foils are butted against each other. The solder-plated surface of the prepared joiner is superposed on the respective abutting edge portions of the electromagnetic wave shielding members. Thereafter, while the joiner is being pressed against the shielding members by a heater, the joiner is solder-welded to both of the electromagnetic wave shielding members via the solder-plated layer.

2 Claims, 3 Drawing Sheets

METHOD FOR JOINING JOINT PORTIONS OF ELECTROMAGNETIC WAVE SHIELDING MATERIALS

BACKGROUND OF THE INVENTION

1. Field of the Invention

The present invention relates to a method for joining edge portions of electromagnetic wave shielding members each consisting of a metal foil or a metal sheet and exhibiting an excellent electromagnetic wave shielding performance.

2. Description of the Prior Art

As a method for joining edge portions of metal sheets and metal foils exhibiting an excellent electromagnetic wave shielding performance for the purpose of insuring electromagnetic shielding in a shield room or the like, the following classes of methods are generally practiced.

i) Superposed seam folding method:

A method of insuring a two-dimensional contact area of electromagnetic wave shielding members per se by superposing the above-mentioned shielding members on one another and carrying out seam folding.

ii) Sticky layer associated metal foil tape sticking method:

A method of sticking a metal foil tape b having an electrically conductive sticky layer a on its back surface onto edge portions of electromagnetic wave shielding members c made of metal foils, thereby sticking and joining the above-mentioned metal foil tape onto the same edge portions via the above-mentioned sticky layer (see FIG. 4).

iii) General solder-joining method:

A method of joining underlying edge portions of electromagnetic wave shielding members c by applying common thread-like solder or liquid solder d to edge portions of the electromagnetic wave shielding members c and thermally welding the same solder by means of a soldering iron (see FIG. 5).

iv) Sealing material filling method:

A method of joining underlying edge portions of metal foil shielding members c by applying electrically conductive sealing materials or puttying materials e onto and between the edge portions (see FIG. 6).

However, in the superposed seam folding method described in paragraph i) above, skill is required in carrying out the folding work. And, when a thin raw material such as a metal foil is used, the raw material is liable to be damaged due to its being folded back. Also the joint surface is remarkably uneven, and so the quality of the finished surface is poor.

In the sticky layer associated metal foil tape sticking method described in paragraph ii) above, since the sticky layer of the metal foil tape is formed by an electrically conductive filler to insure electrical conductivity with the underlying layers, the sticky layer itself does not exhibit such an excellent electromagnetic wave shielding performance. Consequently, electromagnetic waves can leak through the sticky layer, and therefore, it is difficult to insure a satisfactory shielding performance. In addition, due to variations in the adhesives, there is an anxiety concerning the reliability of adhesion over a long period of time.

In the general solder-joining method described in paragraph iii) above, a high degree of skill is required for the soldering work. Also, when the soldering is carried out on a vertical surface or on a ceiling, molten solder can drop therefrom. Hence, the work is technically difficult and at the same time there exists a safety problem. Furthermore, the joined surface is liable to be uneven, whereby the quality of the finished surface is poor.

Further in the sealing material filling method described in paragraph iv) above, like the above-mentioned sticky layer associated metal foil tape sticking method, although electrical conduction with the underlying layer is effected by means of the sealing material or puttying material mixed with electrically conductive filler, since the electromagnetic wave shielding performance of the sealing or puttying material is poor, the shielding performance exhibited by the overall joint is degraded. And, since a principal component of the sealing material or puttying material is a synthetic high-molecular compound, there exists a problem in its durability over a long period of time depending upon the environmental conditions under which it is used.

SUMMARY OF THE INVENTION

The present invention has been proposed in view of the above-mentioned problems associated with the methods in the prior art, and one object of the present invention is to provide a method for simply and reliably joining edge portions of electromagnetic wave shielding members, wherein an excellent electromagnetic wave shielding performance is insured, and a smooth joined surface can be obtained, whereby the finished property of the shield is of high quality.

According to one feature of the present invention, there is provided a method for joining edge portions of electromagnetic wave shielding members, consisting of the steps of butting the respective edge portions of adjacent electromagnetic wave shielding members made of metal sheets or metal foils against each other, superposing a solder-plated surface of a joiner, prepared by solder-plating a surface of a narrow strip of electromagnetic wave shielding material consisting of a metal foil or a metal sheet, on the respective edge portions of the electromagnetic wave shielding members, and thereafter solder-welding the joiner onto the electromagnetic wave shielding members via the solder-plated layer while pressing the joiner with heating means against the abutting shielding members.

According to the present invention, a joiner is preliminary formed by a solder-plating a surface of a narrow strip of electromagnetic wave shielding material consisting of a metal foil or a metal sheet. After the respective edge portions of the electromagnetic wave shielding members made of metal sheets or metal foils are butted against each other, the solder-plated surface of the above-mentioned joiner is superposed on the respective edge portions of the aforementioned electromagnetic wave shielding members. Thereafter, the above-mentioned joiner is integrally joined to the electromagnetic wave shielding members by solder-welding the solder-plated layer of the same joiner thereto while pressing the joiner against the shielding members from above with the heating means.

The above-mentioned and other objects, features and advantages of the present invention will become more apparent by referring to the following description of one preferred embodiment of the invention taken in conjunction with the accompanying drawings.

DETAILED DESCRIPTION OF THE PREFERRED EMBODIMENT

Now the illustrated embodiment of the present invention will be described.

Figure 1:
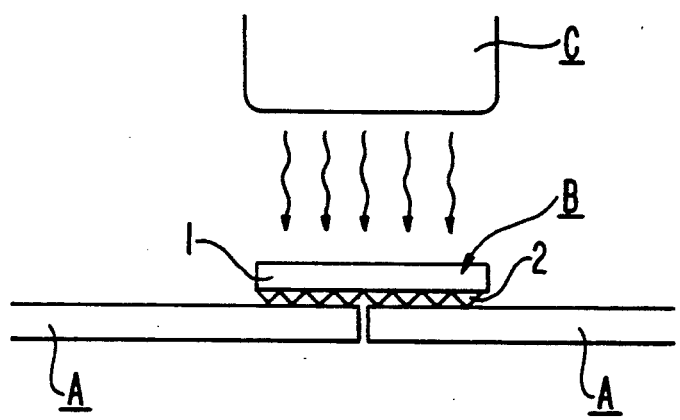
FIG. 1 is a vertical cross-sectional view showing a state in the practice of one preferred embodiment of a method for joining edge portions of electromagnetic wave shielding members according to the present invention.
Figure 2:
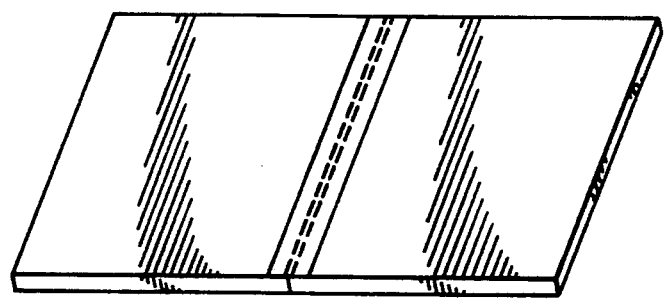
FIG. 2 is a perspective view of electromagnetic wave shielding members joined according to the present invention.

In FIG. 1, reference character A designates electromagnetic wave shielding members consisting of metal foils such as copper foils, rolled iron foils, electrolytic iron foils, etc. or of metal sheets, and reference character B designates a preliminary-produced joiner, in which solder-plated layer or layers 2 are provided on one surface or both surfaces of a narrow electromagnetic wave shielding strip 1 consisting of a metal foil.

Adjacent edge portions of a pair of electromagnetic wave shielding members A are butted against each other. After the joiner B has been superposed on the shielding members A with the solder-plated layer 2 of the joiner B overlying the edge portions of the shielding members A, the solder-plated layer 2 is heated and becomes molten at 200°–300° C. while the joiner B is pressed against the shielding members A by means of a soldering iron C or an iron-like heating instrument which can maintain a predetermined temperature and forces the joiner B into pressing contact with the electromagnetic shielding members A. Thus, the electromagnetic wave shielding strip 1 of the above-described joiner B and the above-described electromagnetic shielding members A are thermally welded through the solder-plated layer 2 and the edge portions of the electromagnetic wave shielding members A are joined together.

It is to be noted that instead of the above-referred to raw materials, galvanized sheet iron, sheet steel, stainless steel sheets, rolled steel foils or electrolytic copper foils can be used as the material for the above-mentioned electromagnetic wave shielding members A.

Also, an electrolytic iron foil, a rolled iron foil, a rolled copper foil, an electrolytic copper foil, etc. can be used as the electromagnetic wave shielding strip for the above-mentioned joiner B.

Figure 3:
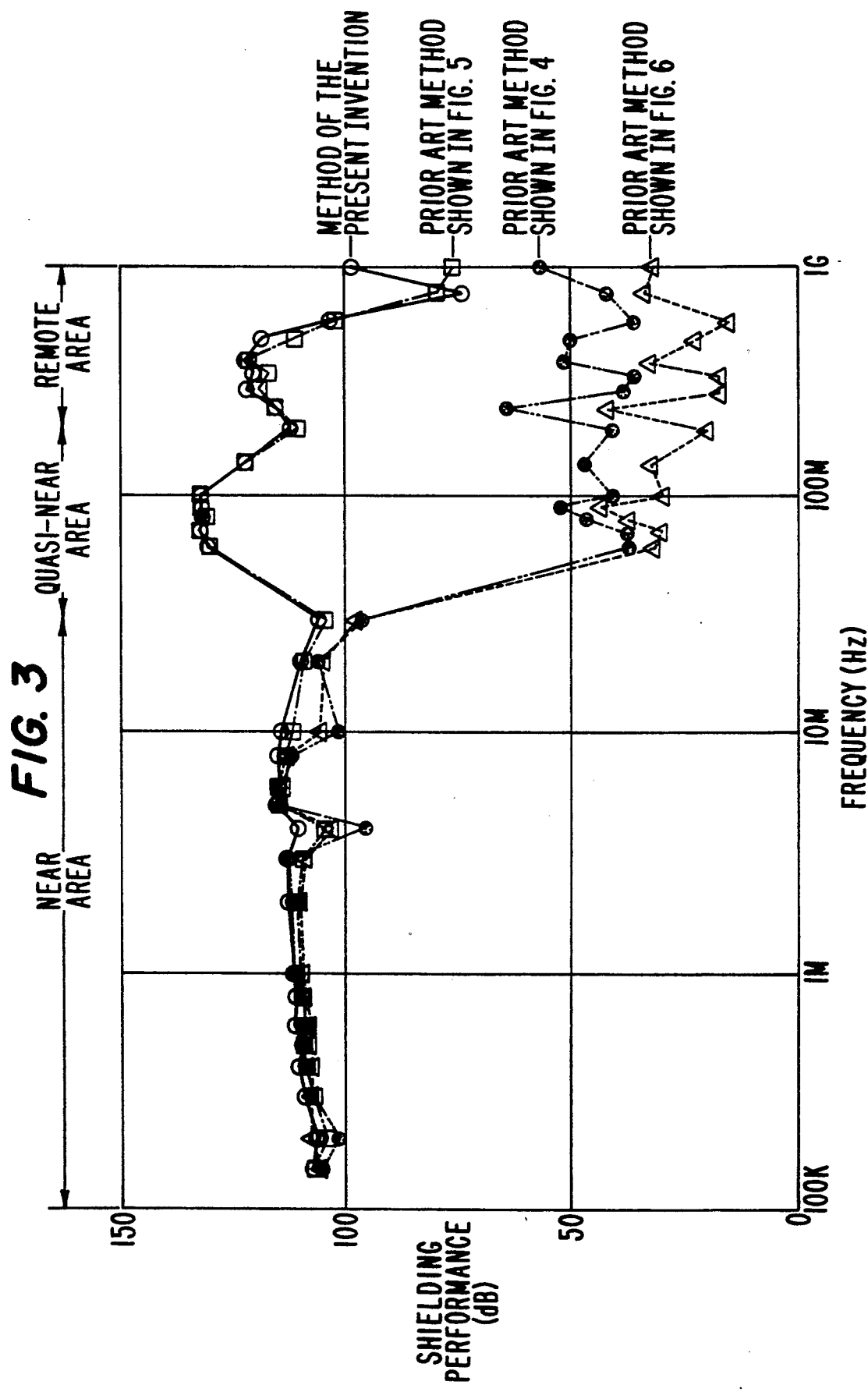
FIG. 3 is a diagram showing measurements of electromagnetic wave shielding performance of electromagnetic wave shielding members joined according to the method of the present invention and according to the methods in the prior art.
Figure 4:
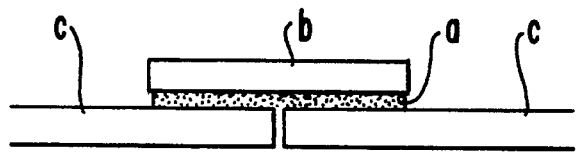
FIGS. 4 to 6 are vertical cross-sectional views showing states, respectively, in the practice of the methods in the prior art.
Figure 5:
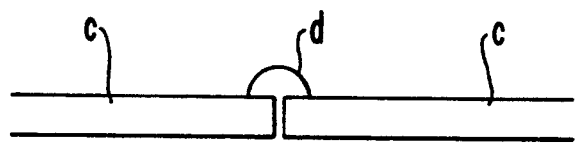
Figure 6:
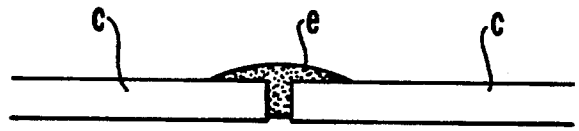

FIG. 3 shows measurements of electromagnetic wave shielding performance of electromagnetic wave shielding members joined according to the method in the prior art shown in FIGS. 4 to 6 and according to the method of the present invention. These measurements show that if the method of the present invention is employed, an electromagnetic wave shielding performance can be obtained of the same quality as that in the case where the general solder-joining method is employed. However, if the method of employing adhesives or a sealing material in the prior art is employed, a remarkable degradation of performance was observed compared to the present invention.

According to the present invention, owing to the fact that a joiner, of a solder-plated narrow strip of electromagnetic wave shielding material strip consisting of a metal foil or a metal sheet, is superposed on abutting edges of adjacent electromagnetic wave shielding members made of metal sheets or metal foils, and that the same joiner is heated on the electromagnetic wave shielding members while the former is pressed against the latter by heating means thereby solder-welding the shielding members together, the degradation of the electromagnetic wave shielding performance at the joint between the shielding members can be suppressed, and the durability of the joint is insured over a long period of time.

In addition, as compared to the general solder-joining method, owing to the fact that the above-mentioned joiner is formed by uniformly solder-plating a narrow electromagnetic wave shielding strip, the finished joint surface is smooth, there is no fear of molten solder dripping from the joint, and so, the method can be safely carried out on shields disposed on a vertical surface or on a ceiling.

While a principle of the present invention has been described above in connection with one preferred embodiment of the invention, it is intended that all matter contained in the above description and illustrated in the accompanying drawings be interpreted as illustrative of the invention and not in a limiting sense.

What is claimed is:

1. A method for joining electromagnetic wave shielding members together, said method consisting of butting respective edges of the shielding members against one another; providing a joiner comprising a narrow strip of electromagnetic wave shielding material having a solder-plated surface; superposing the joiner over the electromagnetic wave shielding members with the solder-plated surface thereof overlying the abutting edges of the shielding members; and thereafter pressing the joiner against the electromagnetic wave shielding members with a heater while heating the same with the heater to a temperature which solder-welds the joiner to the shielding members via the solder-plated layer of the joiner.

2. A method of manufacturing a shield for shielding electromagnetic waves, said method comprising:

providing electromagnetic wave shielding members of a material selected from the group consisting of copper foil including electrolytic copper foil, rolled iron foil including rolled steel foil, electrolytic iron foil, galvanized iron sheets, steel sheets, and stainless steel sheets;

providing a joiner of a strip of electromagnetic wave shielding material having a solder-plated surface, the material of said strip being selected from the group consisting of electrolytic iron foil, rolled iron foil, rolled copper foil, and electrolytic copper foil;

butting respective edges of the shielding members against one another;

superposing the joiner over the electromagnetic wave shielding members with the solder-plated surface thereof overlying the abutting edges of the shielding members; and thereafter pressing the joiner against the electromagnetic wave shielding members with a heater while heating the same with the heater to a temperature which solder-welds the joiner to the shielding members via the solder-plated layer of the joiner.

* * * * *